United States Patent
Lee et al.

(10) Patent No.: US 8,414,836 B2
(45) Date of Patent: *Apr. 9, 2013

(54) EXHAUST SYSTEM

(75) Inventors: Jin Ha Lee, Seoul (KR); Hyokyung Lee, Yongin (KR); Jie Won Park, Suwon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 700 days.

This patent is subject to a terminal disclaimer.

(21) Appl. No.: 12/620,970

(22) Filed: Nov. 18, 2009

(65) Prior Publication Data

US 2011/0047983 A1 Mar. 3, 2011

(30) Foreign Application Priority Data

Aug. 28, 2009 (KR) .................. 10-2009-0080791

(51) Int. Cl.
*F01N 3/10* (2006.01)
*B01D 50/00* (2006.01)

(52) U.S. Cl. ........... 422/171; 422/172; 422/180; 60/295

(58) Field of Classification Search .......... 60/286, 60/295, 301, 303; 422/169, 171, 172, 180
See application file for complete search history.

(56) References Cited

U.S. PATENT DOCUMENTS

| 7,198,764 | B2* | 4/2007 | Fisher et al. | 422/186.04 |
| 7,610,752 | B2* | 11/2009 | Dalla Betta et al. | 60/286 |
| 7,614,214 | B2* | 11/2009 | Yan | 60/286 |
| 7,669,408 | B2* | 3/2010 | McCarthy et al. | 60/286 |
| 8,128,880 | B2* | 3/2012 | Lee et al. | 422/171 |
| 8,240,139 | B2* | 8/2012 | Lee et al. | 60/301 |

FOREIGN PATENT DOCUMENTS

| JP | 2008-68225 A | 3/2008 |
| KR | 10-2008-0045912 A | 5/2008 |
| KR | 10-0888310 B1 | 3/2009 |

* cited by examiner

*Primary Examiner* — Nina Bhat
(74) *Attorney, Agent, or Firm* — Morgan, Lewis & Bockius LLP

(57) ABSTRACT

An exhaust system may include an exhaust line through which exhaust gas that is formed in an engine is exhausted, a nitrogen oxide purification catalyst that is disposed on the exhaust line to reduce nitrogen oxide that is included in the exhaust gas, an injector to additionally inject fuel into the exhaust line or a cylinder, and a fuel cracking catalyst that is disposed between the injector and the nitrogen oxide purification catalyst to crack the fuel that is injected through the injector, to transform the injected fuel into a high efficiency reducing agent, and to raise the temperature of the latter part thereof through an oxidation reaction.

12 Claims, 6 Drawing Sheets

EXHAUST SYSTEM

CROSS-REFERENCE TO RELATED APPLICATION

The present application claims priority to Korean Patent Application No. 10-2009-0080791 filed on Aug. 28, 2009, the entire contents of which are incorporated herein for all purposes by this reference.

BACKGROUND OF THE INVENTION

1. Field of the Invention

The present invention relates to an exhaust system. More particularly, the present invention relates to an exhaust system for reducing nitrogen oxide that is included in exhaust gas.

2. Description of Related Art

Generally, exhaust gas that is exhausted through an exhaust manifold of an engine is induced to pass through a catalytic converter that is mounted in the middle of an exhaust pipe to be purified, and the noise thereof is reduced while passing through a muffler before the exhaust gas is discharged to the outside through a tail pipe.

The catalytic converter processes pollutant materials that are included in the exhaust gas. Further, a particulate filter is mounted on the exhaust pipe to trap particulate material (PM) that is included in the exhaust gas.

A selective catalytic reduction device is a type of catalytic converter. Reducing agents such as carbon monoxide, total hydrocarbon (THC), and so on react well with nitrogen oxide rather than oxygen in the selective catalyst reduction apparatus (SCR), which is why it is called a selective catalyst reduction apparatus (SCR).

In an internal combustion engine to which the selective catalyst reduction apparatus is installed, fuel is continuously and additionally injected according to the nitrogen oxide amount in the exhaust gas. Accordingly, the hydrocarbon can slip from the selective catalyst reduction apparatus, and the fuel consumption is increased.

Also, when the reducing agent is continuously supplied, an oxidation/reduction reaction is also continuously performed in the exhaust pipe. Accordingly, the durability of the catalyst is deteriorated by reaction heat that is formed during the oxidation/reduction reaction.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an exhaust system having advantages of improving the purification efficiency of the nitrogen oxide.

In aspect of the present invention, the exhaust system may include an exhaust line through which exhaust gas that is formed in an engine is exhausted, a nitrogen oxide purification catalyst that is disposed on the exhaust line to reduce nitrogen oxide that is included in the exhaust gas, an injector to additionally inject fuel into the exhaust line or a cylinder, and a fuel cracking catalyst that is disposed between the injector and the nitrogen oxide purification catalyst to crack the fuel that is injected through the injector, to transform the injected fuel into a high efficiency reducing agent, and to raise the temperature of the latter part thereof through an oxidation reaction.

The fuel cracking catalyst may crack a long carbon ring to make a plurality of short hydrocarbons such that the purification efficiency of the nitrogen oxide is improved in the nitrogen oxide purification catalyst.

The fuel cracking catalyst may include a support that includes alumina, zirconia, sulfated alumina, sulfated zirconia, composite oxide of sulfated cerium-oxide and zirconia, tungsten zirconia, tungsten alumina, and zeolite, and at least one catalyst elements of Pt, Pd, Rh, Ir, Ag, Sn, and Ru are formed in the support, wherein the catalyst element of the support ranges from approximately 0.05 wt % to approximately 10 wt % of the mass of an entire wash-coat.

The nitrogen oxide purification catalyst may reduce one part of the nitrogen oxide in the exhaust gas through unburned fuel or hydrocarbon, diffuses the other part thereof to store therein, and uses the reducing agent that is formed in the fuel cracking catalyst to desorb the stored nitrogen oxide in the nitrogen oxide purification catalyst and to reduce the desorbed nitrogen oxide.

The nitrogen oxide purification catalyst may include first and second catalyst layers coated on a support, the first catalyst layer being disposed adjacent to the exhaust gas and the second catalyst layer being disposed adjacent to the support, wherein the injector is controlled to inject the fuel in case in which nitrogen oxide stored in the second catalyst layer is higher than a predetermined value.

The injector may be controlled to inject the fuel in case in which hydrocarbon to nitrogen oxide ratio in the exhaust gas is lower than a predetermined value, wherein the predetermined value of the hydrocarbon to nitrogen oxide ratio is approximately 8.

The first catalyst layer may include at least one of zeolite catalyst and a metal catalyst formed on porous alumina.

The second catalyst layer may include a noble metal and a nitrogen oxide storage material.

The injector may include a first injector that injects the fuel into a cylinder forming a combustion chamber of an engine, and a second injector that is disposed a front portion of the nitrogen oxide purification catalyst.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
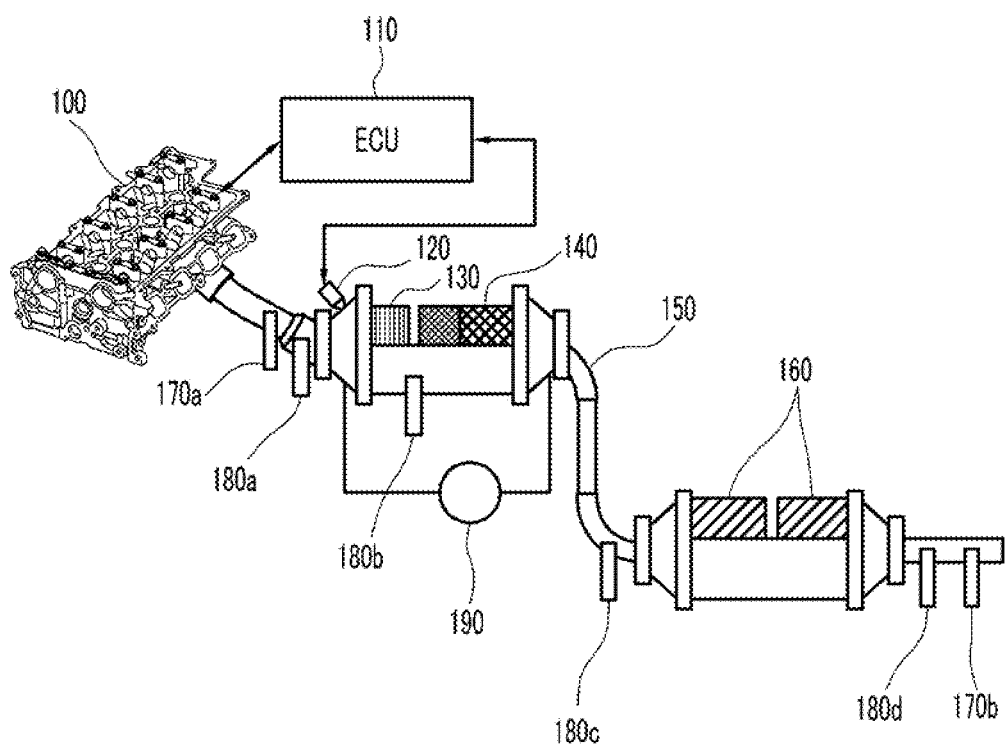
FIG. 1 is a schematic diagram of an exhaust system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of an exhaust system according to an exemplary embodiment of the present invention.

Referring to FIG. 1, an exhaust system includes an engine 100, a control portion 110, an injector 120, a fuel cracking catalyst 130, a catalyzed particulate filter 140, an exhaust line 150, a nitrogen oxide purification catalyst 160, a first oxygen sensor 170a, a second oxygen sensor 170b, a first temperature sensor 180a, a second temperature sensor 180b, a third temperature sensor 180c, a fourth temperature sensor 180d, and a differential pressure sensor 190.

A separate injector is provided in the engine 100 to additionally inject fuel into a cylinder or inject fuel into intake air.

The combustion gas that is exhausted from the engine 100 is exhausted through the exhaust line 150, and the injector 120, the fuel cracking catalyst 130, the catalyzed particulate filter 140, and the nitrogen oxide purification catalyst 160 are sequentially disposed in the exhaust line 150.

The first oxygen sensor 170a and the first temperature sensor 180a are disposed between the engine 100 and the injector 120 on the exhaust line 150, and the second temperature sensor 180b is disposed between the fuel cracking catalyst 130 and the catalyzed particulate filter 140.

Further, the third temperature sensor 180c and the fourth temperature sensor 180d are respectively disposed at the inlet and the outlet of the nitrogen oxide purification catalyst 160, and the second oxygen sensor 170b is disposed at the downstream side of the fourth temperature sensor 180d.

The differential pressure sensor 190 detects a pressure difference between the fuel cracking catalyst 130 and the catalyzed particulate filter 140.

The signals that are detected in the first and second oxygen sensors 170a and 170b, the first, second, third, and fourth temperature sensors 180a, 180b, 180c, and 180d, and the differential pressure sensor 190 are transferred to the control portion 110, and the injector 120 and the engine 100 are controlled according to the transferred signals.

The nitrogen oxide purification catalyst 160 absorbs the nitrogen oxide in the exhaust gas that is generated in the engine 100, and the absorbed nitrogen oxide is desorbed to be reduced by a reducing agent (300, see FIG. 3) that is transformed from the fuel, which is injected through the injector 120, by the fuel cracking catalyst 130.

That is, so as to desorb and reduce the nitrogen oxide that is absorbed in the nitrogen oxide purification catalyst 160, the injector 120 is controlled to additionally inject the fuel, and the fuel cracking catalyst 130 transforms the injected fuel to generate the reducing agent such as HC, CO, H2, and so on. The nitrogen oxide purification catalyst 160 uses the reducing agent to be regenerated.

Referring to FIG. 1, the catalyzed particulate filter 140 traps particulate material (PM) that is included in the exhaust gas to eliminate them in a predetermined condition, for example, it burns them.

The control portion 110 controls the catalyzed particulate filter 140 to be regenerated in a case that the pressure difference that is measured in the differential pressure sensor 190 is higher than a predetermined value. In this case, the fuel is injected from the injector 120 to combust trapped soot that is accumulated in the catalyzed particulate filter 140.

The ratio of the HC in the exhaust gas to the nitrogen oxide that is stored in the nitrogen oxide purification catalyst 160 is set in map data, the control portion 110 compares the HC to NOx ratio with a predetermined value in the map data in a real driving condition, and in a case in which the value is lower than the predetermined value, the injector 120 is operated to inject fuel into the exhaust line. That is, the HC to NOx ratio is increased.

A nitrogen oxide detecting sensor can be disposed at the downstream side of the nitrogen oxide purification catalyst 160, and the nitrogen oxide detecting sensor detects the nitrogen oxide amount in the exhaust gas to transmit the relevant signals to the control portion.

Meanwhile, instead of using a nitrogen oxide detecting sensor, the storage amount of the NOx can be predicted from predetermined map data of experimental values.

The control portion 110 controls the fuel injection amount and the fuel injection timing based on signals that are detected by sensors and the map data to desorb and reduce the nitrogen oxide that is trapped in the nitrogen oxide purification catalyst 160.

For example, the control portion 110 controls the injector to additionally inject the fuel in a case in which the nitrogen oxide amount that is stored in the nitrogen oxide purification catalyst 160 is larger than a predetermined value.

Here, the control portion 110 controls the hydrocarbon (HC) to nitrogen oxide (NOx) ratio to become larger than a predetermined ratio so as to desorb and reduce the nitrogen oxide that is stored in the nitrogen oxide purification catalyst 160. Here, the predetermined ratio can be 8.

The fuel cracking catalyst 130 cuts the chain ring of the carbon compound within the fuel through a catalyst reaction to resolve the fuel. That is, the fuel cracking catalyst 130 cuts the connection ring forming the hydrocarbon through thermal cracking to resolve the fuel.

Also, the fuel cracking catalyst 130 transforms one part of hydrocarbon to the oxidized hydrocarbon to activate the fuel that is injected from the injector 120.

Further, the fuel cracking catalyst 130 transforms the fuel that is injected as liquid to be evaporated to the high reactivity reducing agent (300, see FIG. 3), simultaneously decreases the oxygen concentration by the oxidation reaction, and increases the temperature of the exhaust gas.

The catalyst element that is included in the fuel cracking catalyst is composed of Pt, Pd, Ir, Ag, Sn, Ru, and so on, and the weight thereof can range from 0.05 w % to 10 w % of the total coating material.

Further, in the fuel cracking catalyst, the support to which the catalyst element is attached is composed of alumina, zirconia, sulfated alumina, sulfated zirconia, sulfated cerium oxide-zirconia composite oxide, tungsten zirconia, tungsten alumina, zeolite, and so on.

Figure 4:
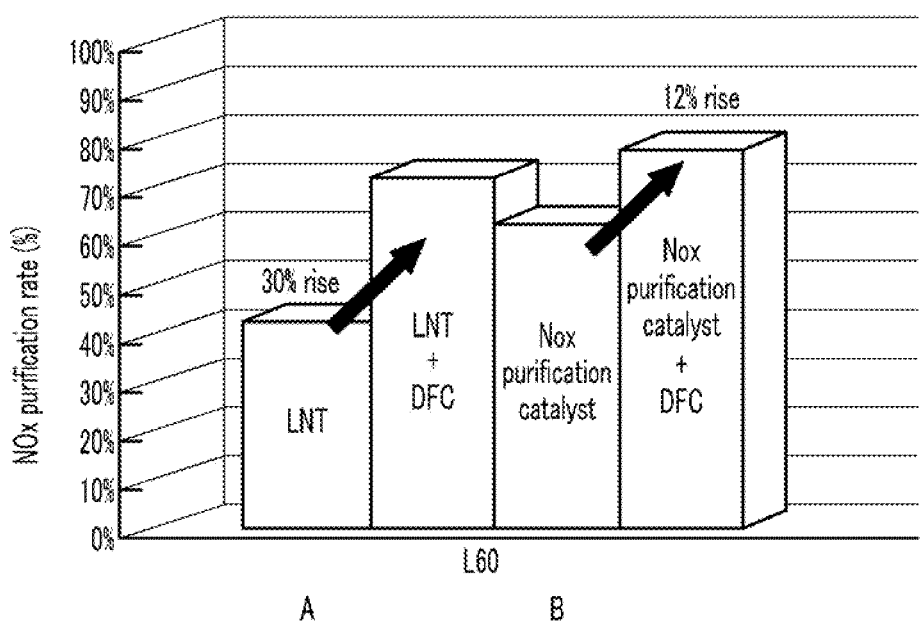
FIG. 4 shows an effect of a fuel cracking catalyst in an exhaust system according to an exemplary embodiment of the present invention.

FIG. 4 shows an effect of a fuel cracking catalyst in an exhaust system according to an exemplary embodiment of the present invention.

Referring to FIG. 4, when the fuel cracking catalyst is used, the purification rate of the nitrogen oxide is improved by about 12% to 30%.

Here, the effect of the fuel cracking catalyst is high at a low exhaust temperature, and there is an effect of improving the purification rate of the nitrogen oxide and preventing the hydrocarbon from slipping.

Figure 2:
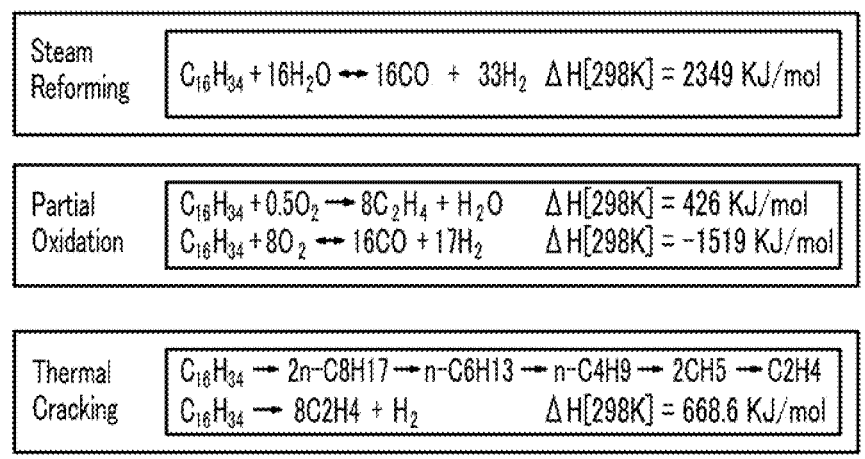
FIG. 2 shows a chemical formula of a process that is formed in a fuel cracking catalyst that is provided in an exhaust system according to an exemplary embodiment of the present invention.
Figure 3:
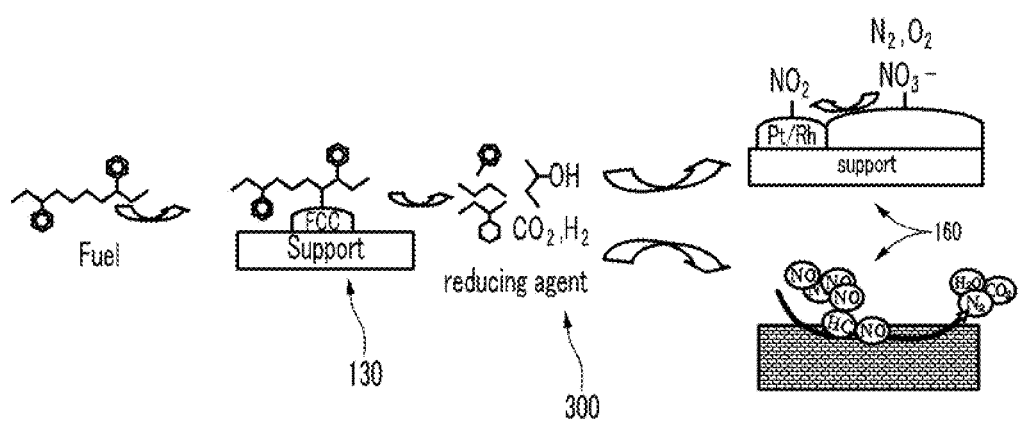
FIG. 3 shows a schematic chemical formula of a process of an exhaust system according to an exemplary embodiment of the present invention.

FIG. 2 shows a chemical formula of a process that is formed in a fuel cracking catalyst that is provided in an exhaust system according to an exemplary embodiment of the present invention, and FIG. 3 shows a schematic chemical formula of a process of an exhaust system according to an exemplary embodiment of the present invention.

Figure 5:
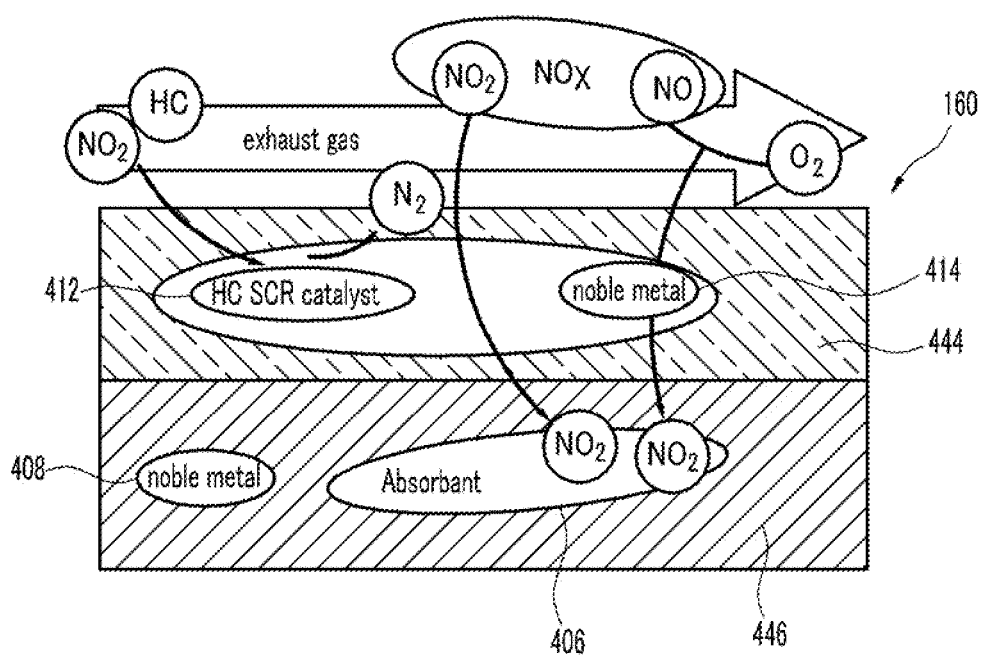
FIG. 5 shows an absorption mode of a nitrogen oxide purification catalyst in an exhaust system according to an exemplary embodiment of the present invention.
Figure 6:
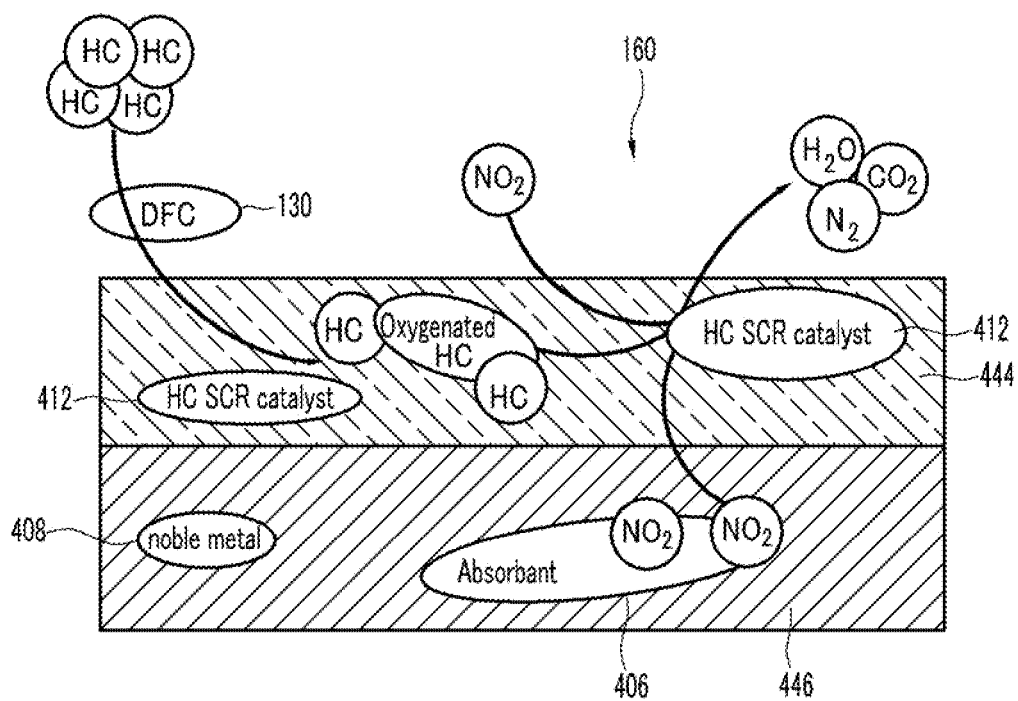
FIG. 6 shows a reducing mode of a nitrogen oxide purification catalyst in an exhaust system according to an exemplary embodiment of the present invention.

FIG. 5 shows an absorption mode of a nitrogen oxide purification catalyst in an exhaust system according to an exemplary embodiment of the present invention, and FIG. 6 shows a reducing mode of a nitrogen oxide purification catalyst in an exhaust system according to an exemplary embodiment of the present invention.

As shown in FIG. 5 and FIG. 6, the nitrogen oxide purification catalyst 160 includes first and second catalyst layers 444 and 446 that are coated on a support. The first catalyst layer 444 is disposed adjacent to the exhaust gas, and the second catalyst layer 446 is disposed adjacent to the support.

The first catalyst layer 444 oxidizes the nitrogen oxide of the exhaust gas, and reduces one part of the oxidized nitrogen oxide through an oxidation/reduction reaction with the unburned fuel or the hydrocarbon that are included in the exhaust gas.

Also, the other part of the oxidized nitrogen oxide is diffused into the second catalyst layer 446. As shown in FIG. 5 and FIG. 6, the first catalyst layer 444 includes at least one of a zeolite catalyst 412 and a metal catalyst 414 that is formed on porous alumina.

The zeolite catalyst 412 is a catalyst in which at least one element of copper, platinum, manganese, iron, cobalt, nickel, zinc, silver, cerium, and gallium thereof is ion exchanged. The chemical reaction in the zeolite catalyst 412 will be described as follows.

$$Z\text{—}Cu^{2+}O\text{—}+NO \rightarrow Z\text{—}Cu^{2+}(NO_2\text{—})_{ads} \rightarrow Z\text{—}Cu^{2+}+NO_2$$

$$Z^+O\text{—}+NO \rightarrow Z^+(NO_2\text{—})_{ads} \rightarrow Z^++NO_2$$

$$Z\text{—}Cu^{2+}(NO_2\text{—})_{ads}+NO \rightarrow Z\text{—}Cu^{2+}N_2O_3\text{—}_{ads} \rightarrow Z\text{—}CU^{2+}O\text{—}+N_2+O_2$$

$$Z\text{—}H^+C_nH_{2n} \rightarrow Z\text{—}C_nH_{2n+1}{}^+ \rightarrow n(Z\text{—}H)+C_nH_{2n}{}^+$$

$$mNO_2+C_nH_{2n}{}^+ \rightarrow C_nH_{2n}N_mO_{2m} \rightarrow N_2+CO_2+H_2O$$

Here, the "Z" signifies the zeolite, and the bottom suffix "ads" signifies adsorption.

Also, the metal catalyst 414 that is formed in the porous alumina includes at least one element of platinum, palladium, rhodium, iridium, ruthenium, tungsten, chrome, manganese, iron, cobalt, copper, and zinc. The chemical reaction in the metal catalyst 414 that is formed in the porous alumina is as follows.

$$NO+O_2 \rightarrow (NO_x)_{ads}$$

$$THC+(NO_x)_{ads} \rightarrow THC\text{—}ONO \text{ or } THC\text{—}NO_2$$

$$THC\text{—}NO_2 \rightarrow THC\text{—}NCO$$

$$THC\text{—}NCO+NO+O_2 \rightarrow N_2+CO_2+H_2O$$

Here, THC signifies hydrocarbon. As stated above, the hydrocarbon signifies the compound that is made up of carbon and hydrogen that are included in the exhaust gas and the fuel.

The second catalyst layer 446 stores one part of the oxidized nitrogen oxide of the first catalyst layer 444, and desorbs the stored nitrogen oxide through the additionally injected fuel in a predetermined condition to reduce them in the first catalyst layer 444.

As stated above, the predetermined condition is a case in which the amount of nitrogen oxide that is stored in the second catalyst layer 446 is higher than a predetermined value of the map data, such that the reduction reaction of the nitrogen oxide is activated in the first catalyst layer 444.

The second catalyst layer 446 includes a noble metal 408 and a nitrogen oxide storage material 406. The nitrogen oxide storage material 406 can be a BaO (barium oxide or barium hydroxide). The noble metal 408 promotes the nitrogen oxide storage material 406 to store the nitrogen oxide. A variety of metal materials such as platinum, palladium, and so on can be an element of the noble metal 408.

Hereinafter, the operating principle according to the present invention will be described.

Nitrogen Oxide Storage Mode

In a case in which the amount of nitrogen oxide that is stored in the second catalyst layer 446 is smaller than a predetermined value, the nitrogen oxide in the exhaust gas is oxidized in the first catalyst layer 444, one part of the oxidized nitrogen oxide reacts with hydrocarbon of the exhaust gas through an oxidation-reduction reaction to become nitrogen gas, and the other part thereof is stored in the second catalyst layer 446. In this process, the hydrocarbon in the exhaust gas is oxidized to carbon dioxide. The reaction that is formed in the first catalyst layer 444 is displayed in the following formulas.

$$NO+\tfrac{1}{2}O_2 \rightarrow NO_2$$

$$NO+HC \rightarrow \tfrac{1}{2}N_2+CO_2$$

Also, while the other part of the oxidized nitrogen oxide and the nitrogen oxide of the exhaust gas are diffused into the second catalyst layer 446 to be stored therein, the noble metal 408 of the second catalyst layer 446 promotes the nitrogen oxide storage material 406 to store the nitrogen oxide. The reaction that is formed in the second catalyst layer 446 is displayed in the following formulas.

$$BaO+2NO_2+\tfrac{1}{2}O_2 \rightarrow Ba\, NO_{32}$$

Nitrogen Oxide Regeneration Mode

In a case in which the nitrogen oxide that is stored in the second catalyst layer 446 is higher than a predetermined value, the control portion 110 controls the injector 120 to inject the fuel. The additionally injected fuel passes through the fuel cracking catalyst (130, DFC), and the fuel is cracked to be low molecules. Also, one part of the low molecular hydrocarbon is transformed to become hydrocarbon that is combined with oxygen to pass through the nitrogen oxide purification catalyst 160.

At this time, the nitrogen oxide is desorbed from the second catalyst layer 446 through a replacement reaction with the hydrocarbon, and this process is briefly displayed as the following formula.

$$Ba\ NO_{32} + 3CO \rightarrow BaCO_3 + 2NO + 2CO_2$$

Also, the nitrogen oxide is reduced to be nitrogen gas through the oxidation-reduction reaction between the hydrocarbon that is combined with the hydrocarbon/oxygen and the nitrogen oxide that is desorbed from the second catalyst layer 446 in the first catalyst layer 444, and the hydrocarbon that is combined with hydrocarbon/oxygen is oxidized to be carbon dioxide. This is displayed as the following formula.

$$NO + HC/\text{Oxygenated HC} = \tfrac{1}{2}N_2 + CO_2$$

As described above, the nitrogen oxide and the hydrocarbon that are included in the exhaust gas are purified.

Instead of continuously injecting the fuel, the control portion 110 controls the injector 120 to inject fuel while the HC to NOx ratio in the exhaust gas is lower than a predetermined value in an exemplary embodiment of the present invention. Accordingly, the fuel is additionally injected in the optimized condition according to the driving condition such that the slip of the hydrocarbon is prevented and the fuel consumption decreases.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust system, comprising;
   an exhaust line through which exhaust gas that is formed in an engine is exhausted;
   a nitrogen oxide purification catalyst that is disposed on the exhaust line to reduce nitrogen oxide that is included in the exhaust gas;
   an injector to additionally inject fuel into the exhaust line or a cylinder; and
   a fuel cracking catalyst that is disposed between the injector and the nitrogen oxide purification catalyst to crack the fuel that is injected through the injector, to transform the injected fuel into a high efficiency reducing agent, and to simultaneously decrease oxygen concentration by an oxidation reaction, and increases a temperature of the exhaust gas.

2. The exhaust system of claim 1, wherein the fuel cracking catalyst cracks a long carbon ring to make a plurality of short hydrocarbons such that the purification efficiency of the nitrogen oxide is improved in the nitrogen oxide purification catalyst.

3. The exhaust system of claim 1, wherein the fuel cracking catalyst includes a support that includes alumina, zirconia, sulfated alumina, sulfated zirconia, composite oxide of sulfated cerium-oxide and zirconia, tungsten zirconia, tungsten alumina, and zeolite, and at least one catalyst elements of Pt, Pd, Rh, Ir, Ag, Sn, and Ru are formed in the support.

4. The exhaust system of claim 3, wherein the catalyst element of the support ranges from approximately 0.05 wt % to approximately 10 wt % of the mass of an entire wash-coat.

5. The exhaust system of claim 1, wherein the nitrogen oxide purification catalyst reduces one part of the nitrogen oxide in the exhaust gas through unburned fuel or hydrocarbon, diffuses the other part thereof to store therein, and uses the reducing agent that is formed in the fuel cracking catalyst to desorb the stored nitrogen oxide in the nitrogen oxide purification catalyst and to reduce the desorbed nitrogen oxide.

6. The exhaust system of claim 1, wherein the nitrogen oxide purification catalyst includes first and second catalyst layers coated on a support, the first catalyst layer being disposed adjacent to the exhaust gas and the second catalyst layer being disposed adjacent to the support.

7. The exhaust system of claim 6, wherein the injector is controlled to inject the fuel in case in which nitrogen oxide stored in the second catalyst layer is higher than a predetermined value.

8. The exhaust system of claim 7, wherein the injector is controlled to inject the fuel in case in which hydrocarbon to nitrogen oxide ratio in the exhaust gas is lower than a predetermined value.

9. The exhaust system of claim 8, wherein the predetermined value of the hydrocarbon to nitrogen oxide ratio is approximately 8.

10. The exhaust system of claim 6, wherein the first catalyst layer includes at least one of zeolite catalyst and a metal catalyst formed on porous alumina.

11. The exhaust system of claim 6, wherein the second catalyst layer includes a noble metal and a nitrogen oxide storage material.

12. The exhaust system of claim 1, wherein the injector includes:
   a first injector that injects the fuel into a cylinder forming a combustion chamber of an engine; and
   a second injector that is disposed a front portion of the nitrogen oxide purification catalyst.

* * * * *